Dec. 7, 1937.  D. F. SMITH  2,101,480
APPARATUS FOR CLARIFYING SACCHARINE LIQUIDS
Filed April 26, 1935  2 Sheets-Sheet 2

Inventor
David F. Smith,
By Samuel H. Cole,
Attorney

Patented Dec. 7, 1937

2,101,480

UNITED STATES PATENT OFFICE 2,101,480

APPARATUS FOR CLARIFYING SACCHARINE LIQUIDS

David F. Smith, Takoma Park, Md.

Application April 26, 1935, Serial No. 18,467

5 Claims. (Cl. 127—16)

The invention relates to the manufacture of sugar; and its objects are to provide for the rapid, convenient, and efficient removal of scum from the surface of juices of racchariferous plants during the process of boiling said juices in a vacuum; and to provide an apparatus for this purpose which may be readily adapted for installation in vessels already in use.

Figure 1:
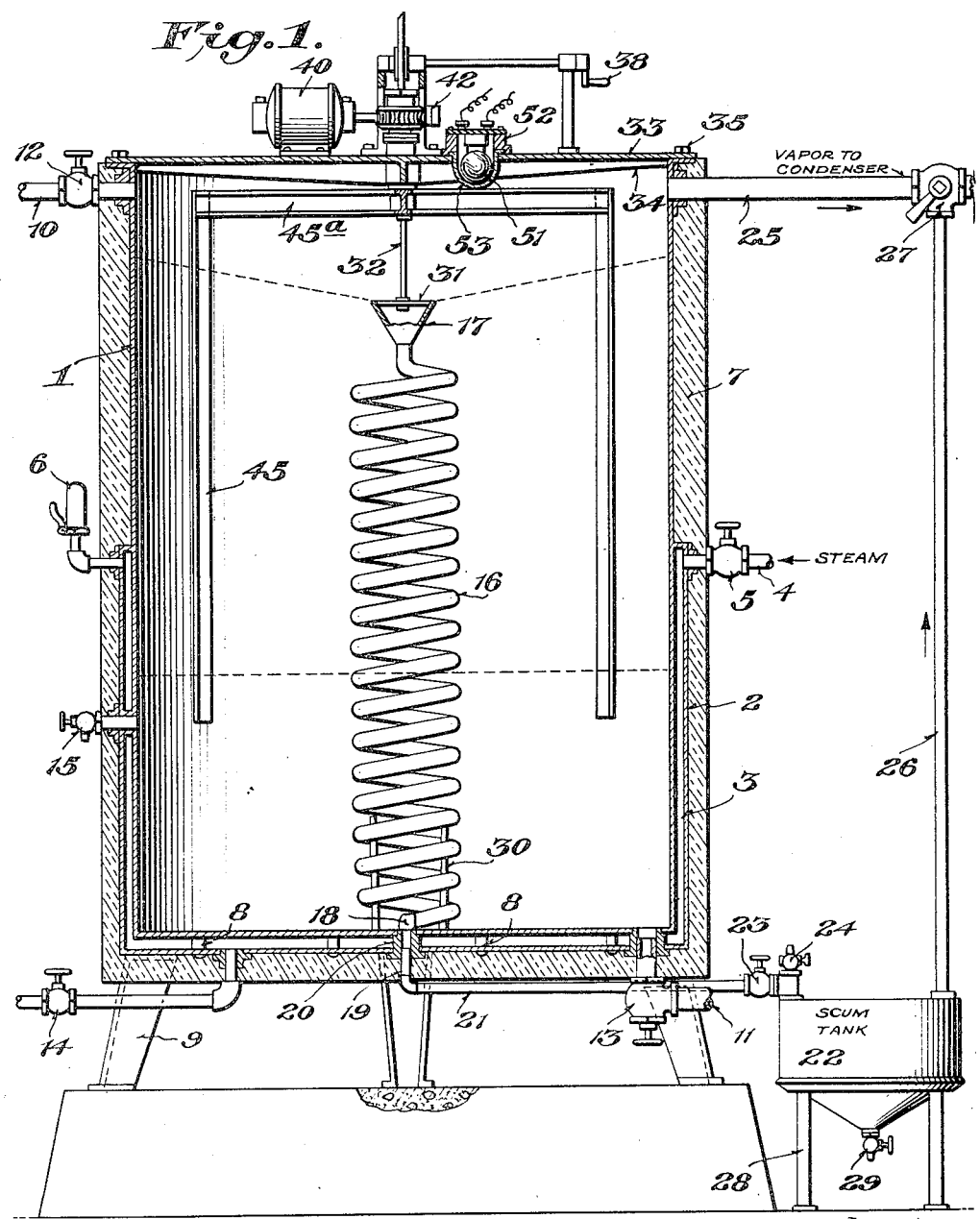
Figure 2:
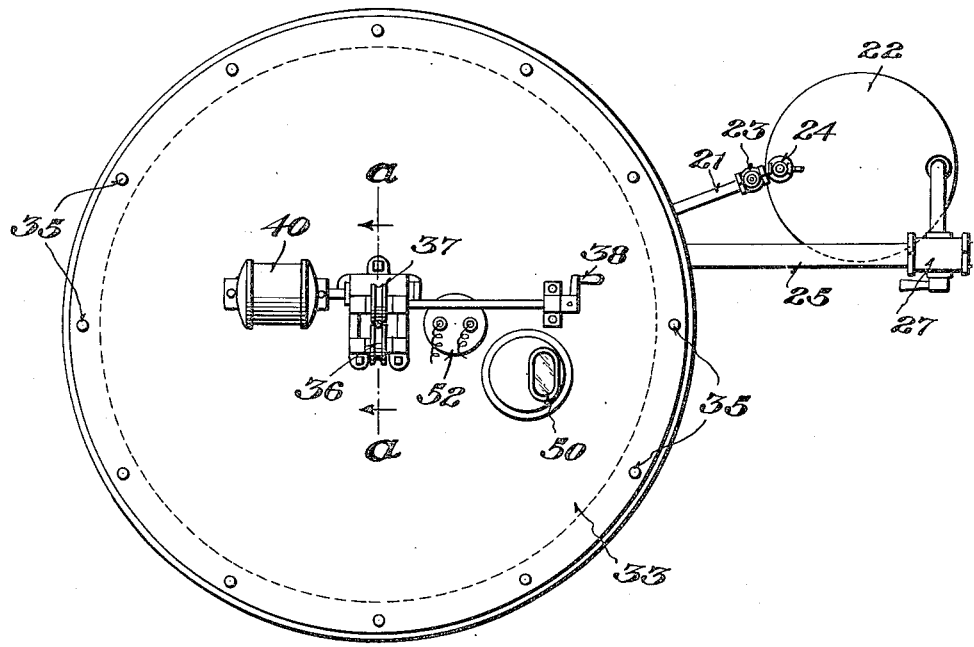
Figure 3:
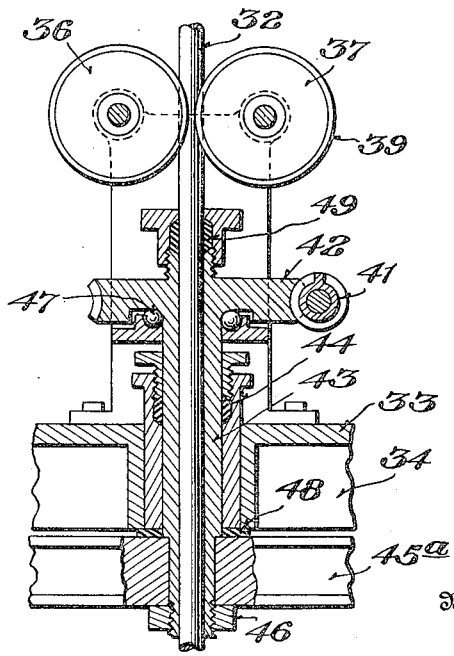

The accompanying drawings, in which Figure 1 is a vertical sectional view of the apparatus; Figure 2 a plan of the apparatus; and Figure 3 a fragmentary detailed view of the funnel adjusting mechanism on line a—a, illustrate the invention.

In the drawings, wherein similar reference numerals indicate corresponding parts throughout the several views, the numeral 1 indicates an inner vessel, or vacuum-pan, for containing the juice during the process of boiling. The lower half of vacuum-pan 1, or as much thereof as may be desired, is inclosed within the steam-jacket 2 which is securely attached, at its upper end, to the side-wall of vacuum-pan 1. The space between the vacuum-pan 1 and the steam-jacket 2 forms a steam-chamber 3 which is supplied with steam from any suitable source (not shown) for heating the contents of vacuum-pan 1. The steam enters chamber 3 through the steam-pipe 4 which is provided with the valve 5 to enable the operator to control the steam pressure in chamber 3. A suitable safety-valve 6 permits the escape of excess steam from chamber 3. The vacuum-pan 1, with the attached steam-jacket 2, is inclosed within the insulating-jacket 7 which may be composed of asbestos, or other suitable insulating material. The bottom of vacuum-pan 1 is supported upon the bottom of steam-jacket 2 by suitable stay-rivets 8 while the entire vessel is supported at the desired height by the base 9. The raw juice is supplied to vacuum-pan 1 through the supply-pipe 10 which enters the side of vacuum-pan 1 through the insulating-jacket 7. After boiling, the defecated juice is discharged from vacuum-pan 1 through the discharge-pipe 11 which passes through the bottom of steam-jacket 2 and the insulating-jacket 7. The discharged juice may be received in any suitable container. Suitable valves 12 and 13 are provided in the supply-pipe 10 and the discharge-pipe 11 respectively to enable the operator to control the ingress and egress of the juice. A drain-cock 14 is provided in the bottom of steam-jacket 2 to permit draining the water of condensation from steam-chamber 3 and a discharge-cock 15 is provided in the side of vacuum-pan 1 below the minimum level for the concentrated juice to permit the withdrawal of samples for testing. The numeral 16 indicates a flexible tubular coil axially disposed within the vacuum-pan 1. Coil 16 terminates at its upper end in the funnel 17 while its lower end is connected to the fitting 18. A nipple 19 is also connected to the fitting 18 and projects downwardly through vacuum-pan 1, steam-jacket 2, and insulating-jacket 7. This nipple is firmly supported by the stuffing-box 20 and its lower end is connected to the discharge-pipe 21 which conveys the scum to the scum-tank 22. Discharge-pipe 21 is provided with the valve 23 for closing the line from the vacuum-pan to the scum-tank. Scum-tank 22 is provided with the petcock 24 and is connected to the exhaust line 25 by the riser 26 which is connected to the three-way valve 27. A source of reduced pressure for operating the exhaust line 25 is provided by any suitable condenser and vacuum-pump which are not shown in the drawings. The scum-tank 22 is elevated upon the support 28 to afford access to the discharge-cock 29 in the conical bottom of the tank. This discharge-cock permits the separation and withdrawal of the juice which may inadvertently be drawn into the scum-tank and also permits the removal of the accumulated scum. Attached to the bottom of vacuum-pan 1 is the upwardly extending guide 30 which is adapted to support the coil 16 against lateral movement. The funnel 17 is provided with the cross-bar 31 which is attached to the vertically movable adjusting-rod 32. The numeral 33 indicates a removable cover for vacuum-pan 1. This cover is reinforced by the cross-members 34 and is clamped in an air-tight manner to the flanged upper rim of vacuum-pan 1 by bolts 35. Mounted upon cover 33 are the adjusting-wheels 36 and 37 which are in frictional engagement with the adjusting-rod 32 and responsive to the rotation of the handle 38 to control the vertical movement of adjusting-rod 32, the attached funnel 17, and coil 16. The rims of the adjusting-wheels are faced with a suitable material 39, such as rubber, to increase their friction upon the adjusting-rod. Mounted also upon cover 33 is the electric motor 40 adapted to drive the worm 41 which is in mesh with the worm-gear 42 upon the upper end of the tubular shaft 43. Shaft 43 is journaled in the stuffing-box 44 and is attached, at its lower end, to the cross-bar 45a of the rotatable stirrer 45 by the nut 46. The weight of this stirrer is carried by the bearing 47 which is in contact with the under side of the worm-gear 42. The washer 48 provides the necessary clearance between the cross-bar 45a and the cover 33. The function of stirrer 45 is to impart a swirling, or rotating, movement to the surface of the juice. Under this condition, the surface of the juice tends to assume a concavity which, simultaneously with the centripetal movement of the scum induced by the rotating juice, causes the scum to collect at the axis of rotation. As the scum gravitates to its axis of rotation, it may be readily removed by the lowering of funnel 17 and simultaneously applying suction to the coil 16. The adjusting-rod 32 passes vertically through the tubular shaft 43 and the stuffing-box 49 and is adapted for slidable movement therein. An observation window 50 is mounted over a conveniently located opening in cover 33 and permits a clear view of the funnel 17 and of the upper surface of the juice contained in vacuum-pan 1. An electric bulb 51 is mounted in the housing 52 over a suitable opening in cover 33 and provides illumination for the interior of vacuum-pan 1. A transparent shade 53 protects the bulb 51.

It will be obvious that the same source of vacuum which effects the desired pressure reduction in the vacuum-pan 1, and which removes, through the exhaust-pipe 25, the vapors generated by the ebullition of the juice during the process of boiling, may also be employed to remove the scum from the surface of the juice through the funnel 17, the coil 16, and the discharge-pipe 21 when the funnel is brought into proper relation with the surface of the juice.

The operation of this invention is as follows:

With the funnel 17 elevated well above the maximum level of the juice contained in the vacuum-pan 1, and with the valves 13 and 23 closed, the valves 12 and 27 are opened in the supply-pipe 10 and the exhaust line 25 respectively. The vacuum-pump (not shown) is started and the raw juice is drawn into the vacuum-pan 1 in the desired amount. When the vacuum-pan 1 is sufficiently charged with the raw juice, valve 5 is opened to admit the steam to the steam-chamber 3. When the raw juice in vacuum-pan 1 has reached the desired level, valve 12 is closed. After the juice in the vacuum-pan has reached the desired temperature, which may be ascertained by observation through the window 50, the motor 40 is started by a suitable switch (not shown) and the stirrer 45 rotated at a speed sufficient to effect the desired concavity in the surface of the juice and a centripetal movement of the scum resulting in the movement of the scum to its axis of rotation. At this time the valve 27 is operated to close the exhaust line 25 to vacuum-pan 1 and to open the riser 26 from the exhaust line to the scum-tank 22. Valve 23 is then opened and the funnel 17 is vertically adjusted by means of handle 38 to bring its rim into correct relation with the surface of the juice to permit the scum to enter the funnel. The suction which is now effective through the coil 16 causes the rapid removal of the scum to the scum-tank 22. From the scum-tank, the accumulated juice and scum may be removed as required through the discharge-cock 29.

Having thus described my invention, I claim:

1. A device of the character described comprising in combination a vacuum pan, a pressure-reducing means connected to the vacuum-pan, means for heating said vacuum-pan, a stirrer rotatably mounted in said vacuum-pan and adapted to impart a centripetal movement to the scum therein, and a flexible discharge-tube disposed within the vertical axis of the vacuum-pan and connected to the pressure reducing means.

2. A device of the character described comprising in combination a vacuum-pan, means for heating said vacuum-pan, a stirrer rotatably mounted in said vacuum pan and adapted to impart a centripetal movement to the scum therein, means for rotating the stirrer, a flexible discharge-tube adjustably disposed within the vertical axis of the vacuum-pan, connections from the vacuum-pan to a pressure reducing means, and connections from the flexible discharge-tube to the pressure reducing connections.

3. A device of the character described comprising in combination a vessel, a steam-jacket for heating said vessel, vacuum connections to said vessel, a removable cover for the vessel, a stirrer rotatably mounted in, and depending from, said cover and adapted to impart a centripetal movement to the scum, means to rotate the stirrer mounted upon the cover, a flexible discharge-coil mounted within the vessel concentric with the stirrer, means for adjusting the height of the discharge-coil, a scum-tank, connections from the discharge-coil to the scum-tank, and connections from the scum-tank to the said first mentioned vacuum connections.

4. A device of the character described comprising in combination a vacuum-pan, a removable cover for said vacuum-pan, a tubular shaft rotatably mounted in the cover, a stirrer attached to the lower end of said shaft and depending into the vacuum-pan said stirrer being adapted to impart a centripetal movement to the scum within the vacuum-pan, a worm-gear attached to the upper end of the shaft, an electric motor mounted upon the cover, a worm connected to the motor shaft and in engagement with the worm-gear, a tubular coil vertically mounted within the vacuum-pan and concentric therewith, a funnel attached to the upper end of the coil, an adjusting-rod attached to the funnel and slidably mounted in the tubular shaft, means mounted upon the cover for vertically moving the adjusting-rod, a support for the tubular coil to prevent lateral movement thereof, a scum-tank, connections from the tubular coil to the scum-tank, and vacuum connections to the vacuum-pan and the scum-tank.

5. A device of the character described comprising in combination a vacuum-pan, a steam-jacket surrounding the vacuum-pan, a scum-tank, a unitary discharge pipe vertically adjustable within the axis of the vacuum-pan and communicating with the scum-tank, a demountable stirring unit adapted to impart a centripetal movement to the scum within the vacuum-pan, and optionally effective vacuum connections to the vacuum-pan and the scum-tank.

DAVID F. SMITH.